(12) United States Patent
Wang et al.

(10) Patent No.: US 8,553,415 B2
(45) Date of Patent: Oct. 8, 2013

(54) ELECTRONIC DEVICE WITH HEAT DISSIPATION MODULE

(75) Inventors: Zhen-Yu Wang, Shenzhen (CN); Chang-Shen Chang, New Taipei (TW); Ben-Fan Xia, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 132 days.

(21) Appl. No.: 13/335,967

(22) Filed: Dec. 23, 2011

(65) Prior Publication Data
US 2013/0050941 A1    Feb. 28, 2013

(51) Int. Cl.
*H05K 7/20* (2006.01)
*G06F 1/20* (2006.01)

(52) U.S. Cl.
USPC ............ 361/697; 361/679.47; 361/679.48; 361/679.5; 361/679.52; 361/679.54; 361/695; 361/700; 361/703; 361/704; 361/709; 361/710; 165/185

(58) Field of Classification Search
USPC .............. 361/679.47–679.48, 679.5, 679.52, 361/679.54–679.56, 694–695, 697, 700, 361/703–704, 709–710; 165/185
See application file for complete search history.

(56) References Cited

U.S. PATENT DOCUMENTS

| | | | | |
|---|---|---|---|---|
| 6,039,532 | A * | 3/2000 | McConnell | 415/119 |
| 7,370,692 | B2 * | 5/2008 | Wei | 165/80.3 |
| 7,924,563 | B2 * | 4/2011 | Kobayashi et al. | 361/695 |
| 7,990,719 | B2 * | 8/2011 | Chen et al. | 361/719 |
| 8,205,665 | B2 * | 6/2012 | Chen | 165/80.3 |
| 2007/0227707 | A1 * | 10/2007 | Machiroutu et al. | 165/121 |
| 2008/0105410 | A1 * | 5/2008 | Hwang et al. | 165/104.33 |
| 2008/0135210 | A1 * | 6/2008 | Wang et al. | 165/80.3 |
| 2009/0183863 | A1 * | 7/2009 | Shu | 165/170 |
| 2012/0318482 | A1 * | 12/2012 | Xia | 165/104.26 |
| 2013/0048256 | A1 * | 2/2013 | Wang et al. | 165/121 |

FOREIGN PATENT DOCUMENTS

JP    57058089 A  *  4/1982

* cited by examiner

*Primary Examiner* — Robert J Hoffberg
(74) *Attorney, Agent, or Firm* — Altis Law Group, Inc.

(57) ABSTRACT

An electronic device includes a casing, a fan, and a heat sink. The casing defines a plurality of through holes therein. The fan defines air outlet at one side thereof facing the through holes of the casing. The air outlet includes a first portion and a second portion. Air pressure in the first portion is larger than air pressure of the second portion. The heat sink includes a first fin set arranged on the first portion and a second fin set arranged on the second portion. A first passage is defined between each two neighboring first fins. A second passage is defined between each two neighboring second fins. A width of the second passage is less than that of the first passage.

16 Claims, 5 Drawing Sheets

ELECTRONIC DEVICE WITH HEAT DISSIPATION MODULE

BACKGROUND

1. Technical Field

The disclosure relates to electronic devices, and, more particularly, to an electronic device with a heat dissipation module.

2. Description of Related Art

A heat dissipation module is often applied to dissipate heat from heat generating components, such as central procession units (CPUs). Generally, a conventional heat dissipation module includes a centrifugal fan and a fin assembly arranged at an air outlet of the fan.

During operation, the fan generates airflow through the fin assembly to take away the heat of the fin assembly absorbed from the heat generating component. However, an amount of the airflow at two sides of the air outlet is larger than an amount of the airflow at a central portion of the air outlet, therefore, dust will deposit on two laterally sides of the fin assembly corresponding to the two sides of the fan along with the airflow.

Thus, it is desired to overcome the described limitations.

DETAILED DESCRIPTION

Figure 1:
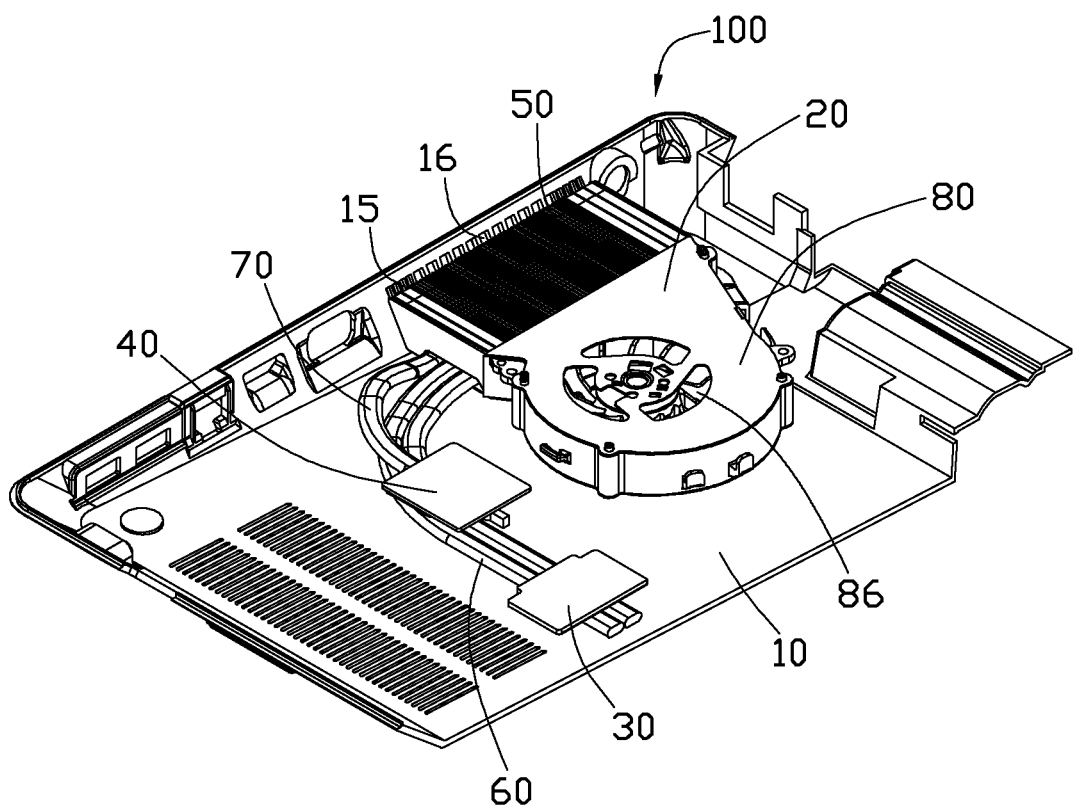
FIG. 1 is an assembled view of an electronic device, according to an exemplary embodiment of the present disclosure.
Figure 2:
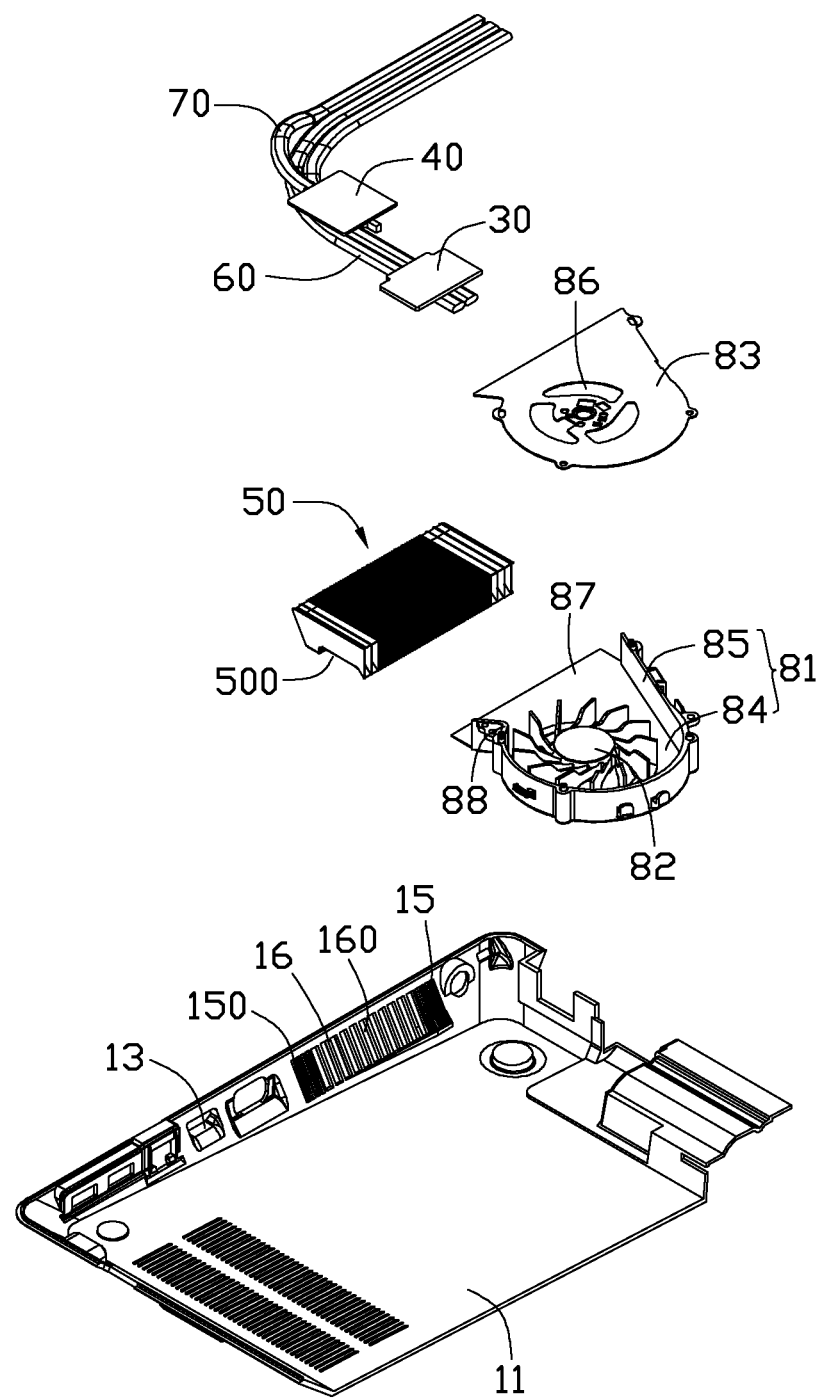
FIG. 2 is an exploded, isometric view of the electronic device of FIG. 1.

FIGS. 1 and 2 show an electronic device 100 in accordance with an exemplary embodiment. The electronic device 100 includes a casing 10 and a heat dissipation module 20.

The casing 10 includes a base 11 and a side plate 13 extending from a laterally side of the base 11. The side plate 13 defines two first hole assemblies 15 and a second hole assembly 16 arranged between the two first hole assemblies 15. Each first hole assembly 15 includes a plurality of first through holes 150, and the second hole assembly 16 includes a plurality of second through holes 160. In the present embodiment, the first through holes 150 and the second through holes 160 are rectangular and with the same height, and extend along a height direction of the side plate 13. A width of each of the second through holes 160 is larger than that of each of the first through holes 150.

The heat dissipation module 20 is disposed on the base 11 of the casing 10. The heat dissipation module 20 includes a first heat conductor substrate 30, a second heat conductor substrate 40, a heat sink 50, two first heat pipes 60 interconnecting the first heat conductor substrate 30 and the heat sink 50, a second heat pipe 70 interconnecting the second heat conductor substrate 40 and the heat sink 50, and a fan 80.

In the present embodiment, the fan 80 is a centrifugal fan, which includes a holder 81, a cover 83 engaged with the holder 81 to form a cavity, and an impeller 82 received in the cavity. The holder 81 includes a bottom plate 84 and a sidewall 85 perpendicularly and upwardly extending from a periphery of the bottom plate 84. The bottom plate 84 and the cover 83 respectively define a plurality of air inlets 86 therein. The sidewall 85 defines an air outlet 87 between two ends of the sidewall 85. A curved tongue portion 88 protrudes inwardly from the sidewall 85, and is adjacent to the air outlet 87.

Figure 3:
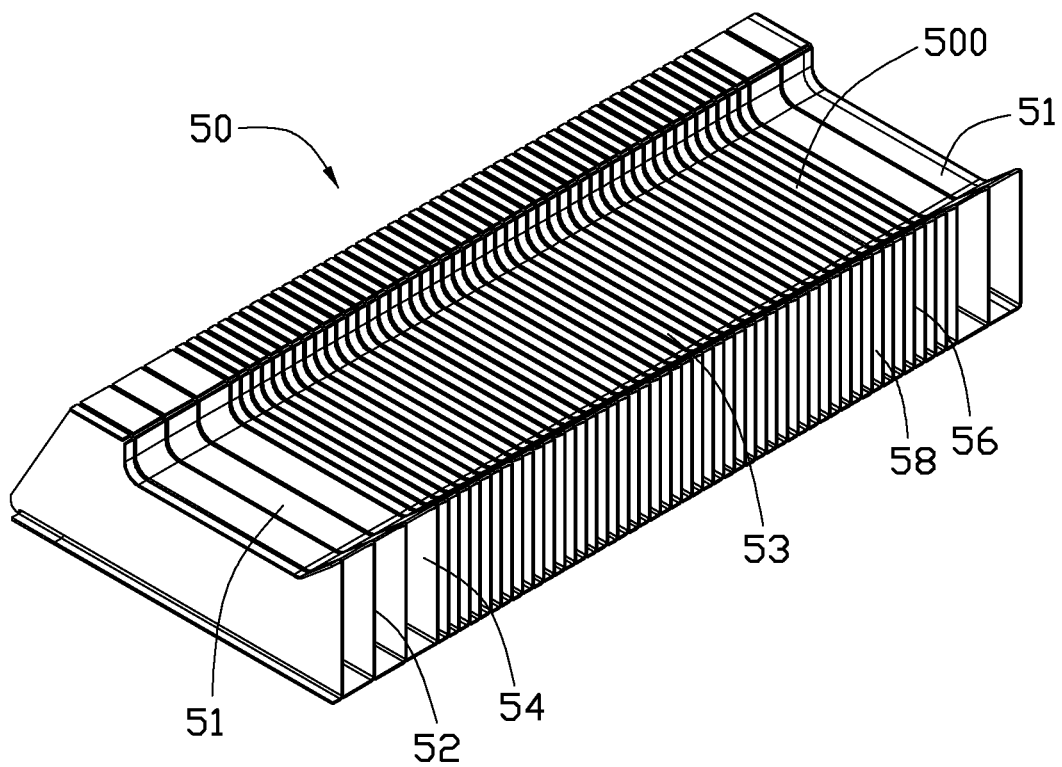
FIG. 3 is an inverted view of a heat sink of FIG. 2.
Figure 4:
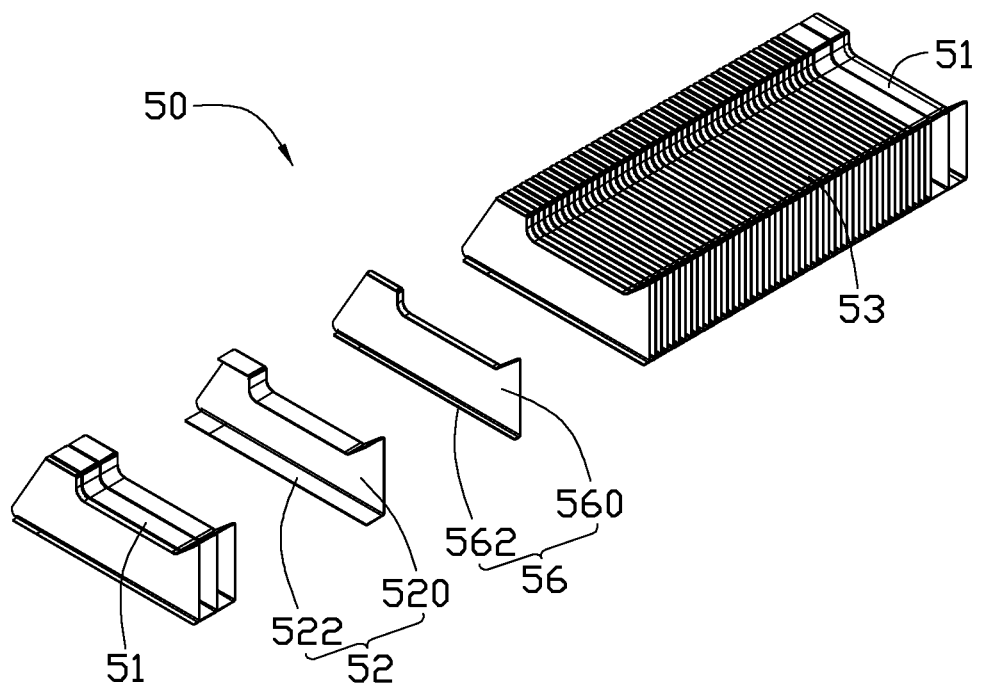
FIG. 4 is an exploded, isometric view of the heat sink of FIG. 3.
Figure 5:
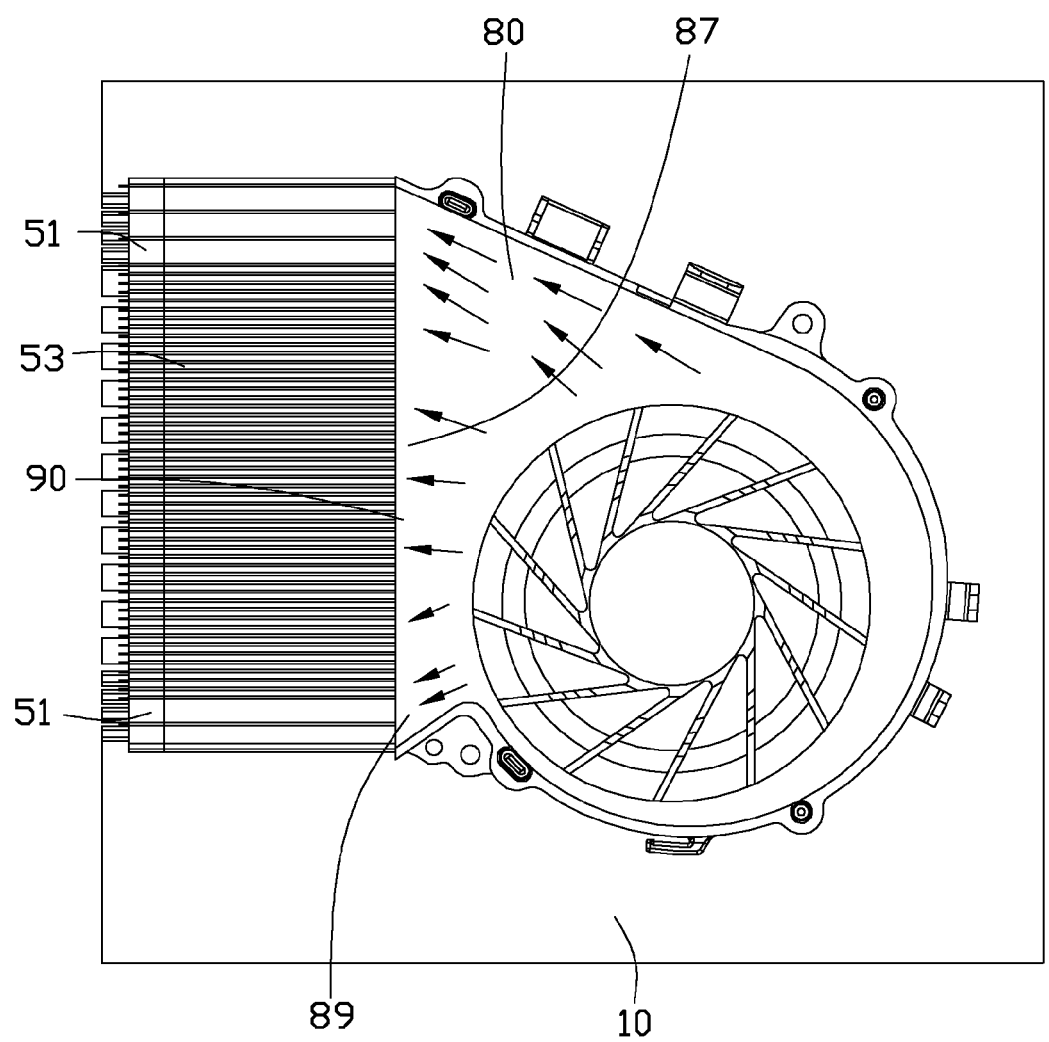
FIG. 5 is a top plan view of the electronic device of FIG. 1.

Also referring to FIGS. 3, 4 and 5, the heat sink 50 is disposed at the air outlet 87 of the fan 80, and includes two first fin sets 51 and a second fin set 53 arranged between the two first fin sets 51. The first fin set 51 includes a plurality of first fins 52 stacked together. Each first fin 52 is parallel to and spaced from a neighboring first fin 52. A first passage 54 is defined between each two neighboring first fins 52 for airflow generated by the fan 80. Each first fin 52 includes a first main body 520 and a pair of first flanges 522 bent horizontally from a top and a bottom of the first main body 520. Each first flange 522 is abutted against a first flange 522 of a neighboring first fin 52. In the present embodiment, the first passages 54 communicates with the air outlet 87 of the fan 80 and the first hole assemblies 15. Each first passage 54 can correspond to one or more than one first through holes 150.

The second fin set 53 includes a plurality of second fins 56 stacked together. Each second fin 56 is parallel to and spaced from a neighboring second fin 56, with a second passage 58 defined between each two neighboring second fins 56 for airflow generated by the fan 80. Each second fin 56 includes a second main body 560 and a pair of second flanges 562 bent horizontally from a top and a bottom of the second main body 562. In the present embodiment, a width of the second flange 562 is less than that of the first flange 522. Each second flange 562 is abutted against a second flange 562 of a neighboring second fin 56. Therefore, a width of the second passage 58 is less than that of the first passage 54. In the present embodiment, the second passage 58 communicates with the air outlet 87 of the fan 80 and the second hole assembly 16. Each second passage 58 can correspond to one or more than one second through holes 160.

In the present embodiment, a bottom portion of the heat sink 50 near the air outlet 87 of the fan 80 defines a notch 500 for receiving ends of the first heat pipes 60 and the second heat pipe 70. The other ends of the first heat pipe 60 and the second heat pipe 70 are respectively thermal connected to a bottom surface of the first heat conductor substrate 30 and a bottom surface of the second heat conductor substrate 40. The first and second heat conductor substrates 30, 40 are respectively configured for contacting electronic elements and absorbing heat generated therefrom.

During operation of the heat dissipation module 20, the impeller 14 rotates and drives airflow from the air inlet 86 into the cavity, and then to the air outlet 87. Air pressure in the two laterally sides of the air outlet 87 is larger than air pressure in the central portion of the air outlet 87, and the width of the first passage 54 is larger than that of the second passage 58; therefore, most dust enter the two laterally sides of the air outlet 87, and flow through the first passages 54 of the first fin sets 51, and then vent from the first through holes 150 along with the airflow. Additionally, the width of each of the first through holes 150 is less than that of the second through holes 160; therefore, it can prevent dust from entering the first fin set 51 via the first through holes 150.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
a casing defining a plurality of through holes therein, the casing comprises a base and a side plate extending from a laterally side of the base, the side plate defining the plurality of through holes therein, the plurality of through holes comprising a plurality of first through holes and a plurality of second through holes, a width of each of the plurality of second through holes being larger than a width of each of the plurality of first through holes;
a fan defining an air outlet at one side thereof facing the through holes of the casing, the air outlet comprising a first portion and a second portion, air pressure in the first portion being larger than air pressure of the second portion; and
a heat sink being located at the air outlet of the fan, the heat sink comprising a first fin set arranged on the first portion and a second fin set arranged on the second portion, the first fin set comprising a plurality of first fins stacked together, a first passage being defined between each of two neighboring first fins, the second fin set comprising a plurality of second fins stacked together, a second passage being defined between each of two neighboring second fins, a width of the second passage being less than a width of the first passage,
wherein each first passage communicates with the first through holes, and each second passage communicates with the second through holes, and
wherein each first passage is aligned only with the first through holes, and each second passage is aligned only with the second through holes.

2. The electronic device of claim 1, wherein each first passage corresponds to at least one of the plurality of first through holes.

3. The electronic device of claim 1, wherein each second passage corresponds to at least one of the plurality of second through holes.

4. The electronic device of claim 1, wherein the fan is a centrifugal fan, the first portion being two opposite side portions of the air outlet, and the second portion being a central portion of the air outlet.

5. The electronic device of claim 1, wherein each first fin of the plurality of first fins comprises a first main body and a pair of first flanges bends horizontally from a top and a bottom of the main body, each first flange being abutted with a first flange of a neighboring fin, the first passage being formed between each of the two neighboring first fins.

6. The electronic device of claim 5, wherein each second fin of the plurality of second fins comprises a second main body and a pair of second flanges bends horizontally from a top and a bottom of the second main body, each second flange being abutted with a second flange of a neighboring second fin, the second passage being formed between each of the two neighboring second fins.

7. The electronic device of claim 6, wherein a width of each second flange is less than a width of each first flange.

8. The electronic device of claim 1, wherein each second fin of the plurality of second fins comprises a second main body and a pair of second flanges bends horizontally from a top and a bottom of the second main body, each second flange being abutted with a second flange of a neighboring second fin, the second passage being formed between each of the two neighboring second fins.

9. The electronic device of claim 1 further comprising a heat conductor substrate and a heat pipe interconnected with the heat conductor substrate and the heat sink.

10. The electronic device of claim 9, wherein a bottom portion of the heat sink defines a notch for receiving one end of the heat pipe.

11. An electronic device comprising:
a casing defining a plurality of through holes at a lateral side thereof, the casing comprises a base and a side plate extending from a laterally side of the base, the side plate defining defines two first hole assemblies and a second hole assembly arranged between the two first hole assemblies, each first hole assembly comprises a plurality of first through holes, and the second hole assembly comprises a plurality of second through holes, a width of each the second through holes being larger than a width of each the first through holes;
a centrifugal fan being received in the casing defining an air outlet at one side thereof facing the through holes; and
a heat sink being located between the casing and the air outlet of the fan, the heat sink comprising two first fin sets corresponding to two laterally side portions of the air outlet and a second fin set arranged between the first fin sets, the second fin set corresponding to a central portion of the air outlet, the first fin set comprising a plurality of first fins defining a plurality of first passages, each of the plurality of first passages defined between each of two neighboring first fins, the second fin set comprising a plurality of second fins defining a plurality of second passages, each of the plurality of second passages defined between each of two neighboring first fins, a width of each of the second passages being less than a width each of the first passages, the first passages respectively communicating with the air outlet of the fan and the first hole assemblies, and the second passages communicating with the air outlet of the fan and the second hole assembly,
wherein the first passages are aligned only with the first through holes, and the second passages are aligned only with the second through holes.

12. The electronic device of claim 11, wherein air pressure of each of the two laterally sides of the air outlet of the centrifugal fan is larger than air pressure of a center thereof.

13. A heat dissipation module comprising:
a casing defining a plurality of through holes therein, the casing comprises a base and a side plate extending from a laterally side of the base, the side plate defining the plurality of through holes therein, the plurality of through holes comprising a plurality of first through holes and a plurality of second through holes, a width of each of the plurality of second through holes being larger than a width of each of the plurality of first through holes;
a centrifugal fan defining an air outlet at one side thereof facing the through holes of the casing, the air outlet comprising a first portion and a second portion, air pressure in the first portion being larger than air pressure of the second portion; and
a heat sink being located at the air outlet of the fan, the heat sink comprising two first fin sets arranged at two laterally side portions of the air outlet and a second fin set arranged between the first fin sets, the first fin set comprising a plurality of first fins with a first passage being defined between each of two neighboring first fins, the second fin set comprising a plurality of second fins with a second passage being defined between each of two neighboring second fins, a width of the second passage being less than a width of the first passage, wherein the first passages communicate with the first through holes, and the second passages communicate with the second through holes, and wherein the first passages are aligned only with the first through holes, and the second passages are aligned only with the second through holes.

14. The heat dissipation module of claim 13, wherein each first fin of the plurality of first fins comprises a first main body and a pair of first flanges bends horizontally from a top and a bottom of the main body, each first flange being abutted with a first flange of a neighboring fin, the first passage being formed between each of the two neighboring first fins.

15. The heat dissipation module of claim 14, wherein each second fin of the plurality of second fins comprises a second main body and a pair of second flanges bends horizontally from a top and a bottom of the second main body, each second flange being abutted with a second flange of a neighboring second fin, the second passage being formed between each of the two neighboring second fins.

16. The heat dissipation module of claim 15, wherein a width of each second flange is less than a width of each first flange.

* * * * *